(12) United States Patent
Vanhoof et al.

(10) Patent No.: US 6,741,605 B1
(45) Date of Patent: May 25, 2004

(54) TERMINAL IDENTIFICATION METHOD, A TERMINAL REALIZING SUCH A METHOD AND AN ACCESS COMMUNICATION NETWORK INCLUDING SUCH A TERMINAL

(75) Inventors: Harry Franciscus Ludovica Vanhoof, Lille (BE); Robert Peter Christina Wolters, Montfort (NL)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/509,375

(22) PCT Filed: Sep. 30, 1998

(86) PCT No.: PCT/EP97/05670
§ 371 (c)(1),
(2), (4) Date: May 18, 2000

(87) PCT Pub. No.: WO99/17502
PCT Pub. Date: Apr. 8, 1999

(51) Int. Cl.[7] .............................................. H04L 12/413
(52) U.S. Cl. ........................................ 370/447; 370/449
(58) Field of Search ................................ 370/310, 313, 370/346, 349, 445, 447, 449, 461, 462, 465; 710/107, 109, 113, 220

(56) References Cited

U.S. PATENT DOCUMENTS

| | | | | |
|---|---|---|---|---|
| 3,755,781 A | * | 8/1973 | Haas et al. ................ 340/10.2 |
| 4,589,120 A | * | 5/1986 | Mendala ..................... 375/117 |
| 4,630,314 A | * | 12/1986 | Smith ......................... 455/505 |
| 4,667,193 A | * | 5/1987 | Cotie et al. ............. 340/825.52 |
| 5,659,787 A | * | 8/1997 | Schieltz ...................... 709/226 |
| 5,926,476 A | * | 7/1999 | Ghaibeh ................. 370/395.65 |
| 5,973,609 A | * | 10/1999 | Schoch ................... 340/825.08 |

OTHER PUBLICATIONS

You et al., "Resampling For Wireless Access", Jun. 1996, pp417–421.*

* cited by examiner

Primary Examiner—Ricky Ngo
Assistant Examiner—Alan V. Nguyen
(74) Attorney, Agent, or Firm—Sughrue Mion, PLLC

(57) ABSTRACT

The invention relates to an identification method for use in a multiple access communication network wherein a terminal. (Ti) with a predefined identifier (IDi) desires access to the network. The identification method includes distribution of a grant message (G(IDx–IDy)), which defines an identifier range (IDx–IDy), from a controller (C) to a plurality of terminals (T1, . . . , Ti, . . . T16) which includes the terminal (Ti). The method further includes comparing the result (Inv(IDi)) of a reordering in a predefined way by the terminal (Ti) of a plurality of elements (IDi-A, IDi-B, IDi-C, IDi-D) included in the identifier (IDi) with the identifier range (IDx–IDy) in order to decide whether the terminal (Ti) receives access or not, e.g. the reversing of bits of a binary number comparing with the identifier range.

5 Claims, 2 Drawing Sheets

TERMINAL IDENTIFICATION METHOD, A TERMINAL REALIZING SUCH A METHOD AND AN ACCESS COMMUNICATION NETWORK INCLUDING SUCH A TERMINAL

The present invention relates to an identification method for use in a multiple access network, a terminal realizing such a method as and an access communication network including such a terminal.

Such a method for use in a multiple access is already known in the art, e.g. from the book *"Digital Communications fundamentals and applications"* written by Bernard Sklar and published in 1988 by Prentice Hall/A Division of Simon & Schuster—Englewood Cliffs, N.J. 07632 with ISBN number 0-13-212713-X 025. In chapter 9 "Multiplexing and Multiple Access" and more particularly on page 497 a Demand—Assignment Multiple Access (DAMA) method is described. Contrary to a fixed assignment method where a terminal has periodic access to a common used channel independent of its actual need, a demand-assignment multiple access is a dynamic assignment schemes where a terminal gets access to the common used channel only when it requests access.

One way to impose order in such a method with multiple users having random access requirements is described on page 505 of this chapter. A polling technique is used to poll periodically the different terminals of the access network to determine their service requests. Different kinds of polling techniques are known in the art. In order to explain the present invention a particular one of these polling techniques i.e. anonymous ranging is described hereafter. The anonymous ranging technique defines for each terminal of the access network a unique terminal identifier. This terminal identifier is for instance a unique number, expressed in bits, which is printed by means of a memory in the hardware of the terminal. A so called grant message is distributed on a regular base from a controller of the access network to the different terminals. Such a grant message defines an identifier range which might be defined by e.g. a lower limit terminal identifier and a upper limit terminal identifier. Each terminal desiring access to the network and whereof the terminal identifier falls within this identifier range is allowed to react on the grant message.

However, contention occurs when different terminals are desiring access at the same time and are having an identifier falling within the same identifier range. These terminals are reacting on the same grant message and are creating collision. The anonymous ranging technique continuous then by dividing the identifier range in subranges. Such a subrange is e.g. the half of the identifier range which is defined by the lower limit terminal identifier and a intermediate terminal identifier dividing the previous range into two substantially equal parts. A following grant message defining such a subrange is distributed to the terminals and when identifiers fall within the same subrange, contention occurs again. The searching technique further operates by continually partitioning the population until there is just a single terminal remaining that wants access. At this moment the remaining terminal receives access and the operation is repeated until again a single terminal is yielded in order to receive access to the communication network.

However, if the terminal population is large and the traffic is bursty, the time required to poll the population with a grant message becomes an excessive overhead burden. This will become clear with the following example. Since a company produces and provides a series of terminals with successive identifiers, it is not unlikely that houses in the same neighborhood will end up having a terminal with close identifiers. Imagine two terminals coupled to the same tree of the access network and having identifiers that only differ by one number e.g. the addresses differ only in the least significant bit. After a crash of this tree of the network, all users of this tree will try to log on at nearly the same time. A lot of time is lost since neighbouring terminals with a very similar address try to log on at nearly the same time and congestion occurs up to partitioning of a very low level of the tree. This problem becomes even worse with the growing number of terminals and therewith the growing number of unique identifiers of terminals.

An object of the present invention is to provide an identification method for use in a multiple access communication network, a terminal realizing such a method and an access communication network including such a terminal, such as the above known method but which has not the above drawback of excessive overhead burden and unacceptable identification delay.

According to the invention, this object is achieved by means of the method terminal and access communication network described herein.

The present invention addresses this problem by providing a method which avoids the need to split the identifier range again and again in identifier subranges. The basic idea of the present invention is to compare the result of a reordering of a plurality of elements included in the terminal identifier of the terminal, in a predefined way, by the terminal, with the identifier range in order to decide whether the terminal receives access or not. In this way, the result of the reordering of the elements of neighbouring addresses which would otherwise fall in the same identifier range, will now fall in a different identifier range.

Indeed, reordered neighboring terminal addresses of terminals which desire access at a substantially equal time, will not fall within the same range anymore and will not content for the some grant message anymore. Less grant messages are turned out in contention of terminals with neighboring addresses whereby less time is wasted for each terminal desiring access to the communication network.

A possible implementation of the present invention is described in claim 2 and is illustrated with a quite simple example to make the implementation clear. Presume terminal A and terminal B with the following identifiers in binary notation 00 11 0 and 00 11 1, respectively, which are neighboring identifiers with respect to the value of the identifiers in the decimal notation, value 6 and value 7, respectively. Placing the element positioned on the least significant place with respect to the total value of the identifier to a more significant place with respect to this total value of the identifier can be realized as shown in this example by placing the least significant bit of the binary notation of the identifiers on the third place of the binary notation of the identifiers, and vice versa. The result of the reordering of the neighboring identifiers of terminal A and terminal B becomes 00 01 1 and 00 11 1 with their values in decimal notation value 3 and value 7 respectively. The distance of the value of the reordered neighboring identifiers becomes indeed bigger and therewith the result of comparing these reordered identifiers with an identifier range or subrange becomes different within a shorter delay .

Yet, a very efficient implementation of the present invention is described in claim 3. Indeed, by reversing the elements of neighboring identifiers whereby the element positioned on the least significant place is reordered on the place of the element positioned on the most significant place, reordered neighboring identifiers are falling immediately within a different subrange. This is made clear with the following simple example: the neighboring identifiers AAAB and AAAC with the least significant place and the most significant place positioned on the most right and the most left place of the identifiers, respectively, are both falling within the subrange AAAA up to AEEE; but the inversed neighboring identifiers BAAA and CAAA are immediately falling in different subranges BAAA up to BEEE and CAAA up to CEEE, respectively.

When a terminal identifier is defined by a unique number expressed in bits, the reverse of the identifier is reached by placing the least significant bit on the position of the most significant bit, the second least significant bit on the position of the second most significant bit, . . . , and neighboring terminal identifiers, which only differ from each other with the least significant bit at the end of the sequence of bits, will differ from each other with the most significant bit at the beginning of the sequence of bits.

It should be noted that as is already made clear in the above paragraph with the example of letters, the present invention is not restricted to terminal identifiers which are expressed by a sequence of bits and the present invention is not restricted to reordering of only single elements being one single bit. Indeed, the present invention may be applied to different kind of identifiers with different kinds of representations through different kind of elements as long as an element of an identifier occupies a place or position in the representation of the identifier which assigns a significance to this place in the determination of the value of the identifier determined according to the system wherein the identifier is used. This is shown with the following two examples:

---

Example 1:

Neighboring identifiers:

| | |
|---|---|
| Identifier A: | Belgium@Antwerp@Vanhoof |
| Identifier B: | Belgium@Antwerp@Wolters |
| with | |
| most significant element: | Country; and |
| least significant element: | Name |

Both identifiers are included in the subrange determined by:

| | |
|---|---|
| Subrange A and B: | Countries starting with "B"; |

Reordering of the neighboring identifiers following the interchange of Name and Country results in:

| | |
|---|---|
| Reordered identifier A: | Vanhoof@Antwerp@Belgium |
| Reordered identifier B: | Wolters @Antwerp@Belgium |

Included in the subranges determined by:

| | |
|---|---|
| Subrange reordered A: | Countries starting with "V" |
| Subrange reordered B: | Countries starting with "W" |

Example 2:

Neighboring identifiers represented by elements which are expressed in the Grey binary reflected code:

| | |
|---|---|
| Identifier A(12 4 6): | 1010 0110 0101 |
| Identifier B(12 4 7): | 1010 0110 0100 |
| with | |
| most significant element: | first code block; and |
| least significant element: | last code block |

Both identifiers are included in the subrange determined by:

| | |
|---|---|
| Subrange A and B: | first block code 1010 |
| | (equivalent 12); |

Reordering of the neighboring identifiers following reversing of the code blocks results in

| | |
|---|---|
| Reordered identifier A: | 0101 0110 1010 |
| Reordered identifier B: | 0100 0110 1010 |

Included in the subranges determined by:

| | |
|---|---|
| Subrange reordered A: | first block code 0101 |
| | (equivalent 6) |
| Subrange reordered B: | first block code 0100 |
| | (equivalent 7) |

---

It should further be noticed that the term "including", used in the claims, should not be interpreted as being limitative to the means listed thereafter. Thus, the scope of the expression "a device including means A and B" should not be limited to devices consisting only of components A and B. It means that with respect to the present invention, the only relevant components of the device are A and B.

Similarly, it is to be noted that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 1:
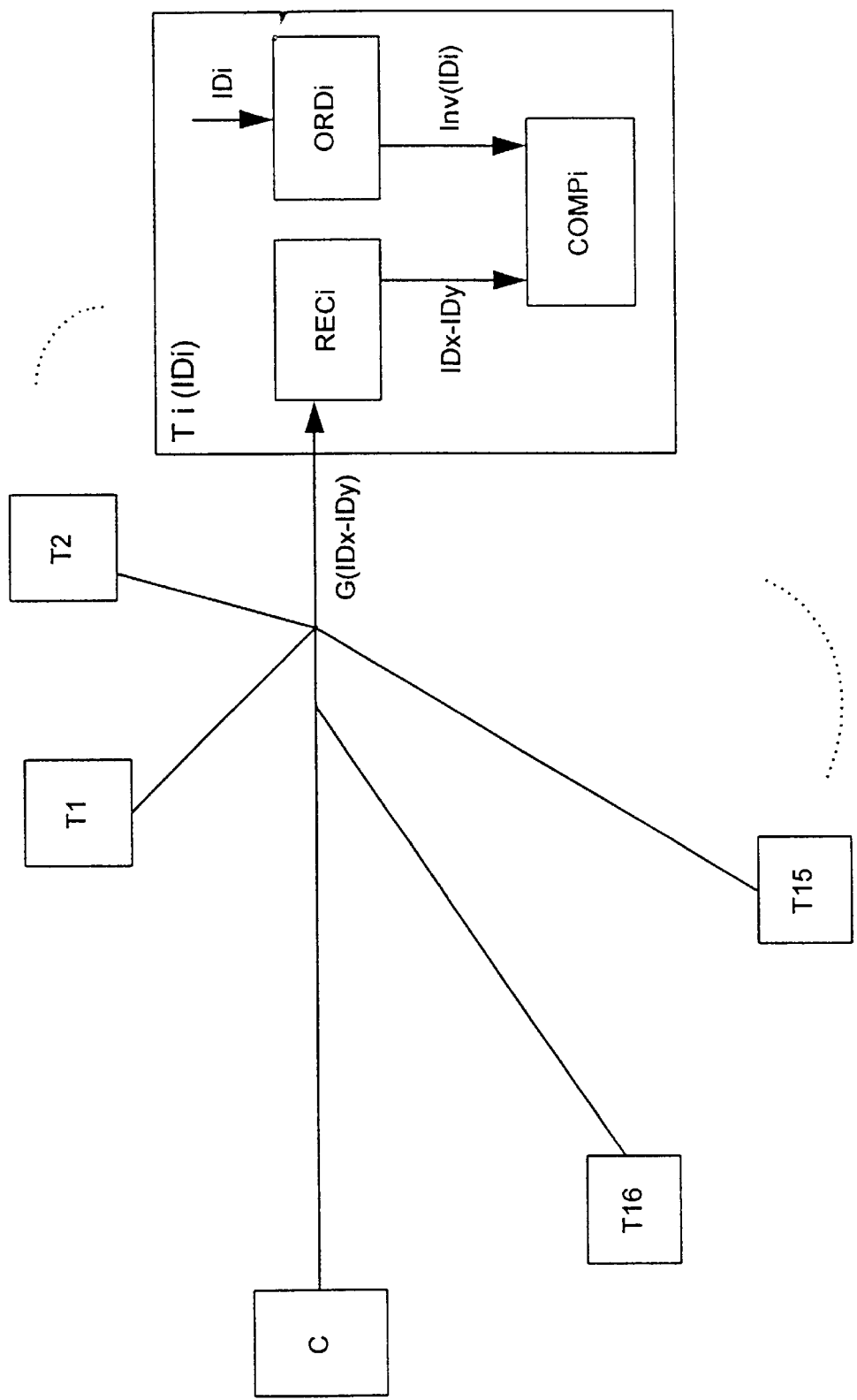
FIG. 1 shows a block scheme of an embodiment of a multiple access communication network wherein the method of the invention is used.

Referring to FIG. 1 an identification method used in a multiple access communication network will be described. First, the working of the identification method will be explained by means of a functional description of the blocks shown in FIG. 1. Based on this description implementation of the functional blocks in FIG. 1 will be obvious to a person skilled in the art and will therefor not be described in detail. In addition, the principle working of the identification method of the present invention will be described in further detail.

The multiple access communication network includes a controller C and a plurality of terminals T1, T2, . . . , Ti, . . . , T15, T16. The controller C is coupled to each terminal T1, T2, . . . , Ti, . . . , T15, T16 via a tree like network i.e. the cascade connection of a common transmission link and individual user links. In order not to overload FIG. 1, only for terminal Ti the detailed functional blocks are shown which will be described in a further paragraph.

Figure 2:
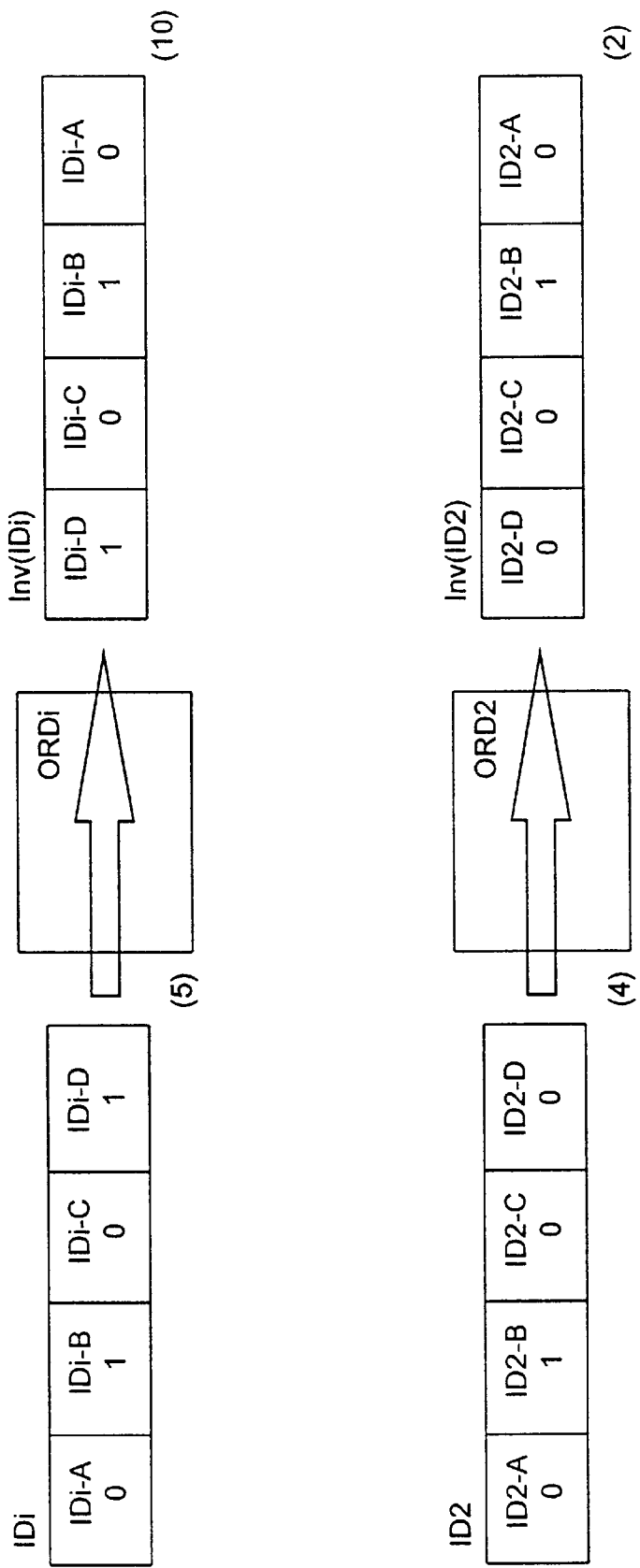
FIG. 2 shows for two terminal identifiers the working of a reordering register used by the present invention.

Each terminal T1, T2, . . . , Ti, . . . , T15, T16 has its own unique identifier in order to be able to identify itself to the controller C. In order not to overload FIG. 1 only the identifier IDi of terminal Ti is shown. Each identifier is determined by a plurality of elements. In order not to overload the description and the present drawing, it is preferred for this particular embodiment to express each identifier by four successive bits. The identifiers with its value for each included element is only shown for two terminals i.e. Ti and T2:

Referring to FIG. 2: identifier IDi of terminal Ti i.e. IDi≅(IDi-A; IDi-B; IDi-C; IDi-D) and identifier ID2 of terminal T2 i.e. ID2≅(ID2-A; ID2-B; ID2-C; ID2-D) are shown. The values of the elements are defined in this particular embodiment as: IDi≅0101 and ID2≅0100. Presuming that these elements are expressing a binary number, the equivalent of the binary number in the decimal notation is: IDi≅5 and ID2≅4 which is defined here as the total value of the identifier IDi and ID2 respectively (shown in FIG. 2 between brackets). It has to be remarked that the successive elements of the identifiers are marked in the terminals by means of a hardware memory (not shown).

It has to be remarked that in order to describe the present invention, for this particular embodiment a time division multiple access network is preferred with a demand-assignment procedure to give a terminal access to the network when it request access. In order to provide access for one of the terminals Ti, T2, ..., Ti, ..., T15, T16 to the multiple access communication network a polling technique, called anonymous ranging technique is used.

This anonymous ranging technique includes periodically polling the terminal population to determine their service request. This is performed with the periodically distribution of a grant message G(IDx–IDy) from the controller C to all the terminals T1, T2, ..., Ti, ..., T15, T16 of its domain. Such a grant message G(IDx–IDy)) defines an identifier range IDx–IDy which determines the terminals which are allowed to react on this grant message G(IDx–IDy)) when they are willing to get access. Presume for this embodiment a starting identifier range IDx–IDy which is determined by the total value in the decimal notation of the following two identifiers:

---
Identifier range ID1–ID16 with
T1: ID1 ≅ 0000 ≅ 0 ; and
T16: ID16 ≅ 1111 ≅ 15

---

Identifier range IDx–IDy≅ID1–ID16 allows in this way reaction from each terminal having a total value equal or bigger then 0 and equal or smaller then 15.

In the event when more than one terminal is reacting on the grant message the identifier range IDx–IDy is partitioned in subranges whereby the controller C distributes a following grant message which defines one of the subranges. Presume for this embodiment the following first partitioning ---
Identifier subrange ID1–ID8 with
T1: ID1 ≅ 0000 ≅ 0; and
T8: ID8 ≅ 0111 ≅ 7 and;
Identifier subrange ID9–ID16 with
T9: ID9 ≅ 1000 ≅ 8; and
T16: ID16 ≅ 1111 ≅ 15

---

Once, one of the terminals T1, T2, ..., Ti, , T15, T16 is the only one to react on such a grant message, access is allowed by the controller C and the implementation of that terminal to the time division multiple access system starts. The implementation of the access procedure including e.g. distance equalization, synchronization and power leveling goes beyond the scope of the present invention. The aim is the identification, as quick as possible, of the "winner" terminal which receives access.

As already mentioned above, since only terminal Ti is described more in detail, it has to be understood that the implementation following this preferred embodiment for the other terminals is realized in a similar way. The terminal Ti includes the following functional blocks:
  a receiver RECi which is included to receive the successive grant messages from the controller C;
  a reordering register ORDi which is included to reorder the elements (IDi-A; IDi-B; IDi-C; IDi-D) of the identifier IDi of the terminal Ti. This will be best understood by referring back to FIG. 2: the reorder register ORDi reads out of the hardware memory (not shown) of terminal Ti, one by one, the elements IDi-A; IDi-B; IDi-C; IDi-D of the terminal identifier IDi, reorders the elements by providing the elements in a reverse way to its output and provides thereby a result Inv(IDi) of the reordering of the identifier IDi. This function is realized by a simplified First In Last Out (FILO) push-down-stack sequential shift register memory. The reordering register ORD2 (not shown) of terminal T2 functions in a similar way and provide thereby a result Inv(IDi2) of the reordering of the identifier ID2. The total value of the identifier changes, by consequence of the reordering, together with the reordering. Indeed, the total value of IDi≅5 is transformed in the total value of Inv(IDi)≅10 and the total value of ID2≅4 is transformed in the total value of Inv(ID2)≅2. This consequence will be used as an advantage and will be explained in the following paragraph.
  a comparator COMPi which is included to compare an identifier with an identifier range in order to decide whether the terminal Ti receives access or not. This means in fact, as described in a previous paragraph, that the value of the identifier is compared with the values of the identifiers defined by the identifiers range. It also has to be remarked that the identifier provided at one of the inputs of the comparator COMPi is in fact the result Inv(IDi) of the reordered identifier IDi. When the identifier falls within the dedicated identifier range the comparator COMPi provides a confirmative control signal (not shown) in order to enable the terminal Ti to react on the received grant message to the controller C.

In the following paragraph, the principle working of the identification method of the present invention will be described by means of an example.

Presume a situation that the controller C wants to start yielding in order to determine one of its terminals willing to get access to the access communication network and that two terminals Ti and T2 with neighboring identifiers i.e. 0101 (5) and 0100 (4) are trying to get access.

The controller C distributes a grant G(IDx–IDy)) message to all its terminals of its domain which includes the starting identifier range as described above:
  IDx–IDy≅ID1–ID16

As well as terminal Ti as terminal T2 receives the grant message with its receiver and provides the identifier range ID1–ID16 to the included comparator. In the mean time, the reordering register of the terminal reads out of its hardware memory the elements of its identifier, reorders the elements in the reverse way and provides the reordered identifier also to its comparator.

As well the comparator of terminal Ti as the comparator of terminal T2 compares the reordered identifiers with the received identifier range
  Inv(IDi)≅10 and Inv(ID2)≅2 comparing with the range 0–15; and both comparators are providing a confirmative control signal.

It has to be remarked that since the other terminals are not requesting to get access to the network, no processing of the grant message is executed.

The terminals Ti and T2 are reacting to the controller C whereby the controller C knows that at least a terminal is willing to log on to the network but, however, determines also contention between different terminals. The controller C devises the actual polling range as described above and distributes again a grant message which determines, this time the first identifier subrange i.e. ID1–ID8.

The assimilation of the received grant message is performed by both terminals in a similar way as above and both comparators are comparing the reordered identifiers with the received identifier range ID1–ID8:

Inv(IDi)≅10 and Inv(ID2)≅2 comparing with the range 0–7.

The comparator of terminal Ti provides a negative control signal and no reaction message is provided to the controller C. The comparator of terminal T2, however, provides a confirmative control signal and the terminal T2 provides a reaction message to the controller C. This reaction message is the only reaction message received by the controller C and hence terminal T2 receives access to the access communication network.

It has to be remarked that in the event that no reordering should have happened, the identifiers of both terminals Ti and T2 are falling as well in the starting identifier range: IDi≅5 and ID2≅4 comparing with the range 0–15; as in the first subrange: IDi≅5 and ID2≅4 comparing with the range 0–7. Even more, a following partitioning following identical rules as above results in a further subrange of IDx–IDy≅4–7 wherein again both identifiers are falling. This continuous up to a partitioning of a subrange which is defined by only one terminal identifier. For this preferred embodiment four partitionings are required when no reordering takes place and only one partitioning is required when a reverse reordering takes place before comparing.

The above described example shows that the present invention considerably accelerates the identification method of a terminal desiring access to a multiple access communication network when a reordering of the elements of an identifier takes place before comparing.

It has to be remarked that in this preferred embodiment all the terminals are comparing their reordered identifier with the provided identifier range which makes the implementation of the present invention more simple. Indeed, the rule of reordering should be respected for all specified terminals of the controller since otherwise, in a mixed situation wherein some of the terminals are comparing with their reordered identifier and another part of the terminals are comparing with their not reordered identifier, conflict situations will occur. However, application of the present invention is also possible in a mixed situation e.g. whereby an extra element in the identifier is used in order to indicate whether the comparing should be done with the reordered identifier or with the not reordered identifier. However, such an implementation requires for the terminals interpreting means in order to interpret this extra identifier and for the controller extra logic in order to control the predefined chances for each terminal to get access to the network and to avoid conflict situations.

Although the above description of the preferred embodiment is defining a lower limit and an upper limit in order to define the identifier range in the grant message, the application of the present invention is not limited to such definitions of identifier range. Indeed, small modifications, evident to a person skilled in the art, may be applied to the above described embodiment in order to adapt it to define an identifier range in a grant message e.g.

once a lower limit has been communicated, it is memorized and used by the terminals until another lower limit is provided to the terminals by the controller and only the upper limit has to be communicated by the grant message to the terminals;

a grant message which defines a reference which refers to one of a plurality of predefined and stored in each terminal identifier ranges.

Another remark concerns the terminal identifier which following the above described embodiment is stored in a hardware memory of the terminal and after being read out reordered by the reordering register. Although this preferred embodiment describes the reordering function is such a way, the application of the present invention is not reduced to it. Indeed, different implementation are possible in order to provide a reordered identifier to the comparator:

a hardware marked identifier, reading out straight on and reordering in a software way;

a hardware marked identifier, reading out in a reordered sequence;

a hardware marked reordered identifier, reading out straight on;

It has to be remarked that the application of the invention is not limited to a time division multiple access communication network as described in the chosen embodiment of the present application. Small modifications, evident to a person skilled in the art, may be applied to the above described embodiment in order to adapt it to be integrated in other multiple access networks e.g. frequency division multiple access network, or even more, an access network wherein no type of multiplexing is used e.g. an access network wherein for each terminal a different upstream link is used for the upstream coupling to the controller. While the principles of the invention have been described above in connection with specific apparatus, it is to be clearly understood that this description is made only by way of example and not as a limitation on the scope of the invention, as defined in the appended claims.

What is claimed is:

1. An identification method for use in a multiple access communication network wherein a terminal with a predefined identifier desires access to said network, said identification method comprising:

distributing a grant message, which defines an identifier range, from a controller to a plurality of terminals including said terminal and being coupled to said controller;

reordering in a predefined way by said terminal a plurality of elements included in said identifier with said identifier range; and comparing a result of the reording in order to decide whether said terminal receives access.

2. An identification method according to claim 1, wherein said reordering includes placing at least one of said plurality of elements positioned on a least significant place with respect to the total value of said identifier to a more significant place.

3. An identification method according to claim 2, wherein said reordering is a reversing of said plurality of elements of said identifier.

4. A terminal having a predefined identifier and adapted to get access to a multiple access communication network including a controller communicably linked to a plurality of terminals which includes said terminal, said controller including distribution means to distribute a grant message defining an identifier range, from said controller to said plurality of terminals said terminal comprising:

receiving means adapted to receive said grant message;

reordering means adapted to reorder in a predefined way a plurality of elements included in said identifier and to provide thereby a result of said reordering of said identifier; and comparing means adapted to compare said result with said identifier range in order to decide whether said terminal receives access.

5. An access communication network comprising:

a controller; and a plurality of terminals communicably linked to said controller, each of said terminals having a predefined identifier and being adapted to get access to said multiple access communication network, said controller comprising distribution means to distribute a grant message defining an identifier range from said controller to said plurality of terminals, each of said terminals comprising:

receiving means adapted to receive said grant message;

reordering means adapted to reorder in a predefined way a plurality of elements included in said identifier and to provide thereby a result of said reordering of said identifier; and comparing means adapted to compare said result with said identifier range in order to decide whether said terminal receives access.

* * * * *